(12) United States Patent
Bedingfield et al.

(10) Patent No.: US 7,394,895 B2
(45) Date of Patent: *Jul. 1, 2008

(54) METHODS AND SYSTEMS FOR 1+ PREPAID ROUTING SERVICE

(75) Inventors: James C. Bedingfield, Lilburn, GA (US); Stephen R. LaPierre, Union City, GA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/505,767

(22) Filed: Aug. 17, 2006

(65) Prior Publication Data

US 2007/0121889 A1    May 31, 2007

Related U.S. Application Data

(63) Continuation of application No. 10/136,066, filed on Apr. 30, 2002, now Pat. No. 7,095,834.

(51) Int. Cl.
*H04M 3/42* (2006.01)
*H04M 7/00* (2006.01)
*H04M 15/00* (2006.01)

(52) U.S. Cl. .................. 379/201.02; 379/114.2; 379/114.28; 379/127.03; 379/127.04; 379/207.13; 379/221.09; 379/221.14

(58) Field of Classification Search ............ 379/127.03, 379/127.04, 207.02, 207.04, 207.11, 114.2, 379/114.28, 114.29, 201.02, 207.13, 221.08, 379/221.09, 221.14
See application file for complete search history.

(56) References Cited

U.S. PATENT DOCUMENTS

| 4,191,860 | A | 3/1980 | Weber |
| 5,247,571 | A | 9/1993 | Kay et al. |
| 5,392,344 | A | 2/1995 | Ash et al. |

(Continued)

FOREIGN PATENT DOCUMENTS

WO    WO 99/23808    11/1998

*Primary Examiner*—Harry S. Hong
(74) *Attorney, Agent, or Firm*—Cantor Colburn LLP

(57) ABSTRACT

The present invention provides methods and systems for automatically routing a long distance call placed by a subscriber to a prepaid service provider. Six exemplary methods are discussed for allowing the prepaid subscriber to directly dial a called party's long distance telephone number, and then routing the placed call to a prepaid service. The subscriber, in each case, is not required to first dial the telephone number of the prepaid service provider before dialing the called party.

19 Claims, 8 Drawing Sheets

U.S. PATENT DOCUMENTS

| | | |
|---|---|---|
| 5,475,749 A | 12/1995 | Akinpelu et al. |
| 5,550,912 A | 8/1996 | Akinpelu et al. |
| 5,621,787 A | 4/1997 | McKoy et al. |
| 5,696,809 A | 12/1997 | Voit |
| 5,796,813 A | 8/1998 | Sonnenberg |
| 5,805,587 A | 9/1998 | Norris et al. |
| 5,805,682 A | 9/1998 | Voit et al. |
| 5,809,128 A | 9/1998 | McMullin |
| 5,903,639 A | 5/1999 | Lipchock et al. |
| 5,923,744 A | 7/1999 | Cheng |
| 6,078,581 A | 6/2000 | Shtivelman et al. |
| 6,101,246 A | 8/2000 | Heinmiller et al. |
| 6,104,800 A | 8/2000 | Benson |
| 6,173,051 B1 | 1/2001 | Lipchock et al. |
| 6,195,422 B1 | 2/2001 | Jones et al. |
| 6,246,757 B1 | 6/2001 | Cai et al. |
| 6,252,952 B1 | 6/2001 | Kung et al. |
| 6,252,953 B1 | 6/2001 | Gruchala et al. |
| 6,304,641 B1 | 10/2001 | Culli et al. |
| 6,327,258 B1 | 12/2001 | Deschaine et al. |
| 6,330,308 B1 | 12/2001 | Cheston, III et al. |
| 6,560,327 B1 | 5/2003 | McConnell |
| 6,665,388 B2 | 12/2003 | Bedingfield |
| 6,950,506 B2 | 9/2005 | Ruckart et al. |
| 2003/0161459 A1 | 8/2003 | McBlain et al. |

METHODS AND SYSTEMS FOR 1+ PREPAID ROUTING SERVICE

CROSS-REFERENCE TO RELATED APPLICATIONS

This application is a continuation of U.S. patent application Ser. No. 10/136,066 filed Apr. 30, 2002, now U.S. Pat. No. 7,095,834 the contents of which are incorporated by reference herein in their entirety.

FIELD OF THE INVENTION

The present invention relates generally to the field of telecommunications. More particularly, the present invention relates to methods and systems for 1+prepaid routing service.

RELATED APPLICATIONS

Related to the following applications filed by Bedingfield et al.: U.S. Utility Patent Application entitled "Methods and Systems for Automated Prepaid Service Routing", which was filed concurrently with the present application on Apr. 30, 2002; U.S. Provisional Patent Application No. 60/064,230 filed Nov. 4, 1997; U.S. Utility Patent Application, claiming priority to 60/064,230 filed Nov. 4, 1998; PCT Application No. PCT/US98/23443 claiming priority to 60/064,230 filed Nov. 4, 1998; and U.S. patent application Ser. No. 09/530,723 filed May 2, 2000. These applications are hereby incorporated by reference.

ACRONYMS

The following acronyms used in the written description of the present invention are hereby defined as follows:
- ACM—ISUP Address Complete Message
- AIN—Advanced Intelligent Network
- ANM—ISUP Answer Message
- AT—Access Tandem
- AuthTerm—Authorize Termination
- BRI—Basic Rate Interface
- CSN—Compact Service Node
- DN—Dialed Number
- DS—Digital Signal
- DTMF—Dual Tone MultiFrequency
- EMRS—enhanced Media Resource Server
- EO—End Office
- FC—Feature Code
- IAM—ISUP Initial Address Message'
- ILEC—Incumbent Local Exchange Carrier
- ISDN—Integrated Services Digital Network
- ISUP—ISDN User Part
- IVR—Interactive Voice Response system
- IXR—Inter eXchange Carrier
- LATA—Local Access and Transport Area
- LDN—Long Distance Number
- PODP—Public Office Dialing Plan
- PRI—Primary Rate Interface
- PSTN—Public Switched Telephone Network
- SCP—Signal Control Point
- SN—Service Node
- SPA—Service Package Application
- SS7—Signaling System 7
- SSP—Signal Switching Point
- STP—Signal Transfer Point
- TAT—Termination Attempt Trigger
- TCAP—Transaction Capability Application Part
- WAN—Wide Area Network

BACKGROUND

A popular service offered by telecommunications companies is a prepaid or calling card service. Many long distance callers purchase prepaid cards. These cards are ubiquitous in society and are offered for sale at numerous retail establishments.

Prepaid cards, as the name suggests, enable a caller to pay in advance for telephone service. Such cards are used by travelers to avoid high fees for hotel long distance services, for example. Prepaid cards are also given to students by their parents to enable those students to call home without incurring long distance fees. Additionally, prepaid cards are often carried by callers who want mobility, but not the expense of a cellular phone.

Prepaid services, though, are not limited to calling card services. For instance, some local telephone company customers do not wish to allow users of a telephone the ability to make long distance calls, unless the caller pays for such calls. Such a scenario may exist in a business or residential context. In a business context, an employer may desire to tightly control costs, and not pay for non-business calls by employees. In a residential context, a parent may not wish to allow a child to make any long distance calls without first receiving the parent's permission.

Additionally, a telephone customer with either an inadequate income or a poor credit history may not be able to arrange for long distance service without first paying for such service. Such a customer often has long distance dialing blocked from the customer's telephone, and therefore must dial into prepaid service (often using an "800" number) in order to make long distance calls.

A prepaid service subscriber is conventionally required to first dial a prepay service provider telephone number. The subscriber may then be required to enter a PIN to be validated by the prepaid service platform. After being validated, the subscriber may then dial a long distance telephone number for the party that the subscriber wishes to call.

This conventional method of requiring a subscriber to dial two telephone numbers (i.e., one for the prepaid service provider and another for the called party) is cumbersome for a subscriber to a prepaid service. What is needed are methods and systems that overcome the disadvantages of conventional requirements. Such methods and systems should provide additional advantages, including cost effectiveness, flexibility, and ease of implementation.

BRIEF SUMMARY

An embodiment of the present invention provides for the automated routing of long distance calls for subscribers to a prepaid calling service directly to the prepaid platform without requiring the subscriber to first dial the telephone number of the prepaid platform. Implementations of the present invention comprise at least one of a method, a process, a system, an apparatus, a computer readable medium, and a data stream.

An embodiment of the present invention automatically routes a long distance call from a subscriber terminal to a prepaid platform via a method comprising: receiving a dial string from the subscriber terminal, wherein the dial string consists of a long distance number; receiving subscriber data from a database server, wherein the subscriber data comprises a calling number and routing instructions; extracting the routing instructions from the subscriber data; routing the long distance call from the subscriber terminal to the prepaid platform in accordance with the routing instructions; and forwarding the calling number and the long distance number to the prepaid platform. Additionally, a personal identification number (PIN) may be included as subscriber data and forwarded to the prepaid platform.

In embodiments, data forwarded to the prepaid platform may be encapsulated within a Signaling System (SS7) message, such as an Initial Address Message (IAM). Additionally, the dial string may consist of a feature code and a long distance number in an embodiment.

Another embodiment of the present invention provides a system for automatically routing a long distance call from a subscriber terminal to a prepaid platform comprising: a subscriber terminal for receiving a dial string from a subscriber, wherein the dial string consists of a long distance telephone number; at least one database server for storing subscriber data, wherein the subscriber data comprises a calling number and routing instructions; a signal communications network comprised of a plurality of interconnected communications switches for routing a communications message; a signal control network comprised of a plurality of packet switches for routing a control message, wherein a control message directs the path of the communications message through the communications network; and a prepaid platform for providing the subscriber with access to the long distance communications services; wherein the subscriber terminal is connected to the signal communications network; wherein the prepaid platform is connected to the signal communications network; and wherein in response to the subscriber inputting the dial string, the communications message generated from the subscriber terminal is routed from the subscriber terminal to the prepaid platform in accordance with the routing instructions, and the calling number and the long distance number are forwarded to the prepaid platform via the signal control network. Additional embodiments include the employment of class of service routing. Embodiments may operate in different telecommunications environments, and employ different signal transport technologies, such as the DS hierarchy and ISDN.

Embodiments of the present invention provide subscribers to a prepaid calling service with a more efficient process for accessing the prepaid service than does a conventional method. Exemplary embodiments permit the subscriber to access long distance service by first dialing a feature code. Other embodiments permit the subscriber to place a long distance call by directly dialing a called party.

Embodiments of the present invention may be practiced in a variety of communications environments, including, but not limited to, a public switched telephone network employing digital signal (DS) hierarchy and Integrated Services Digital Network (ISDN) transport technologies.

Additional objects, advantages, and novel features of the invention will be set forth in part in the description which follows, and in part will become more apparent to those skilled in the art upon examination of the following, or may be learned by practice of the invention.

DETAILED DESCRIPTION

As required, detailed embodiments of the present invention are disclosed herein. However, it is to be understood that the disclosed embodiments are merely exemplary of the invention that may be embodied in various and alternative forms. Specific structural and functional details disclosed herein are not to be interpreted as limiting, but merely as a basis for the claims as a representative basis for teaching one skilled in the art to variously employ the present invention. The present invention may be practiced without some or all of these specific details. In other instances, well known process operations have not been described in detail in order not to unnecessarily obscure the present invention.

Figure 1:
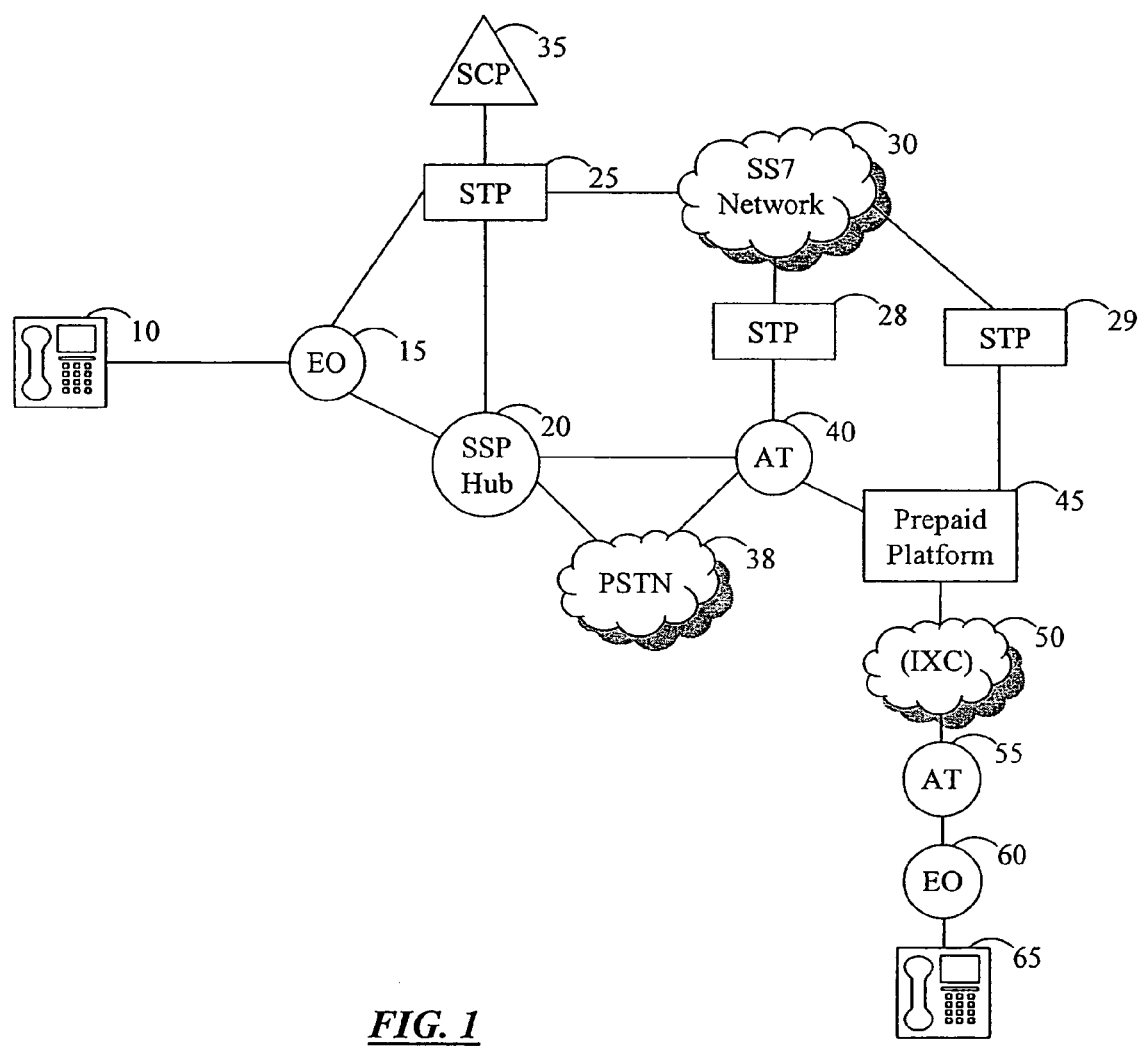
FIG. 1 comprises a functional block diagram illustrating an exemplary environment in which embodiments of the present invention operate.

Referring now to the drawings, in which like numerals indicate like elements throughout the several figures, FIG. 1 comprises a functional block diagram illustrating an exemplary environment in which embodiments of the present invention operate. In FIG. 1, a prepaid platform service provides a mechanism for a subscriber to such a service to establish a long distance call to a party, who is located in a different Local Access and Transport Area (LATA).

The subscriber places a call (or sends a communications message) from a telephone (or terminal) 10 in the subscriber's residence, for example. The subscriber's telephone 10 is in communication with an End Office switch 15. The End Office (EO) switch 15 is in turn connected to an SSP Hub 20, which is an SSP switch having AIN capabilities. When a subscriber places a call from a telephone 10, the End Office switch 15 captures and forwards the digits dialed by the subscriber to the SSP Hub 20. The SSP Hub 20, in turn, formulates a TCAP message, comprised of the calling number (i.e., the subscriber's telephone number) and the called number (which was dialed by the subscriber). This TCAP message is forwarded from the SSP Hub 20 to a STP 25, which performs a global translation and queries a SCP 35 for a subscriber data. The SCP 35 comprises a database server for the storage of subscriber data comprising a subscriber telephone number, a subscriber personal identification number (PIN), and routing instructions (such as a class of service routing parameter, which may be a telephone number for a prepaid platform 45) in profile records. Such profile records may be used to determine how calls made by a subscriber should be routed.

The SCP 35 returns a TCAP message to the STP 25 with routing instructions for the call placed by the subscriber. Instructions for routing of the subscriber's call through the PSTN 38 are forwarded as Signaling System 7 (SS7) control messages through an SS7 network 30, which is a signal control network comprised of a plurality of interconnected STP packet switches. Control messages, which direct the path of a communications message (e.g., a telephone call) are exchanged between STP 25 and STPs 28 and 29 via the SS7 network 30 in order to connect the call from the subscriber to a called party.

The STP 25 directs the SSP Hub 20 via a TCAP message as to where to route the subscriber's call. In the present example, the subscriber's call would next be routed via the Public Switched Telephone Network (PSTN) 38 to an access tandem (AT) switch 40. The PSTN 38 is a signal communications network comprised of a plurality of interconnected communications switches for routing a communications message (e.g., a telephone call). AT switch 40 provides a communications circuit interface between an Incumbent Local Exchange Carrier (ILEC) and another service provider, such as a prepaid platform 45.

In FIG. 1, a call may be routed to a prepaid platform 45, which may then route the call over another communications network, such as an Interexchange Carrier (IXC) or long distance carrier network 50 in order to connect the subscriber to the called party's telephone 65. The call is completed when an access tandem switch 55 cross-connects to a circuit from the IXC network 50 to the circuit provided by the EO switch 60 (or SSP) of the called party's ILEC. At this point, the subscriber's long distance call from the subscriber's residential telephone 10 is connected to the called party's telephone 65.

Figure 2:
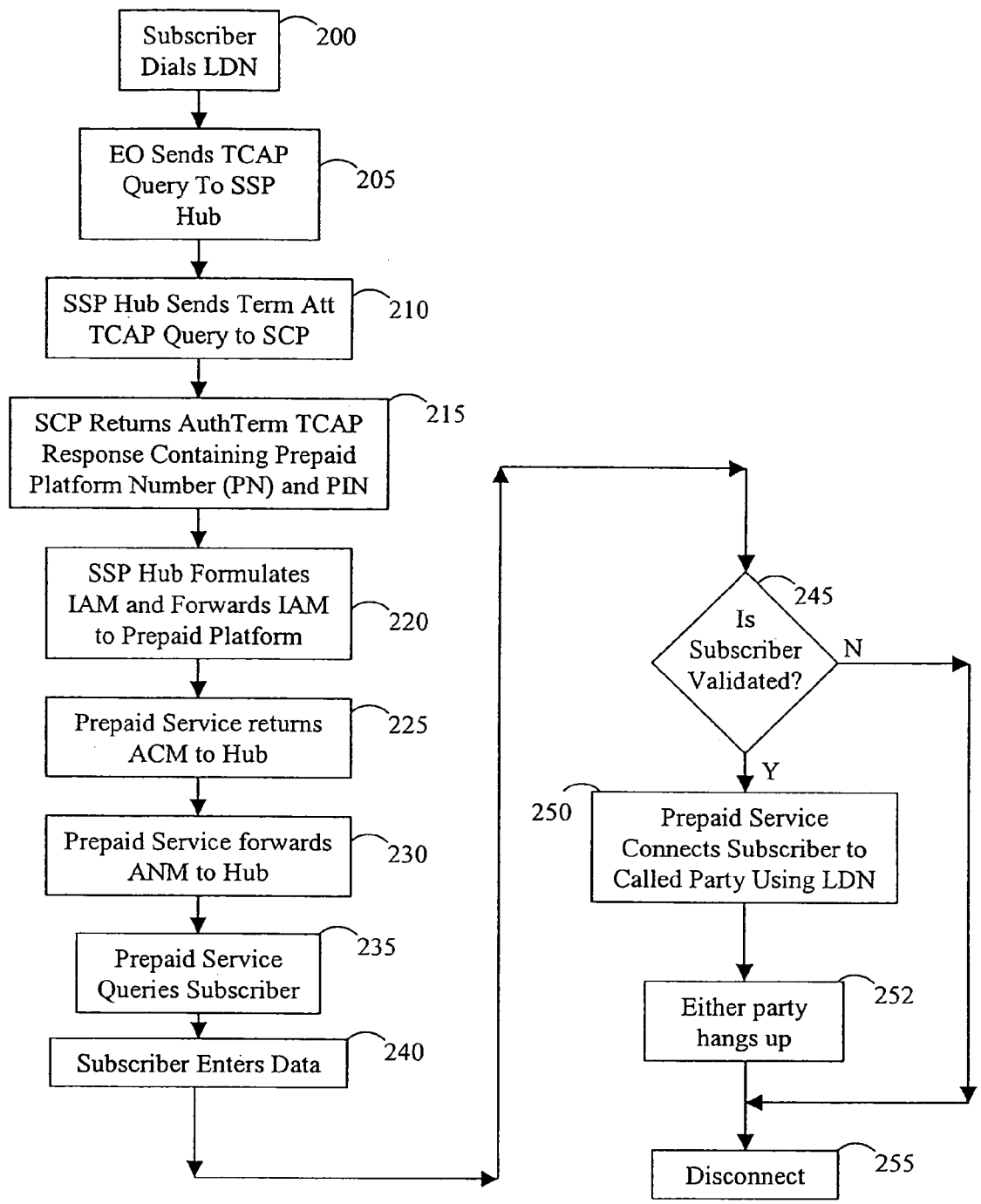
FIG. 2 illustrates a flow chart for an exemplary process for automatically routing a long distance call to a prepaid service platform using SS7 or ISDN signaling to the platform.

FIG. 2 comprises an exemplary flow diagram for an embodiment of the present invention in which a subscriber dials only a called party's number, and the subscriber's call is automatically routed to a prepaid platform service. In such an embodiment, a subscriber, using a telephone (or subscriber terminal) 10 dials (or inputs) a dial string which consists of only a long distance number (LDN) in step 200.

An end office (EO) switch 15 in step 205 forwards a TCAP query message (a TAT or Termination Attempt Trigger) to an SSP Hub 20. In step 210, the Hub 20 subsequently forwards the TCAP query through a STP 25 to a SCP 35. The SCP 35 accesses subscriber profile records. A subscriber profile record is comprised of fields indicating subscriber call handling, including routing instructions or a class of service parameter that indicates the provider to which a subscriber's long distance calls should be routed. In this exemplary case, the class of service parameter for long distance routing indicates that the subscriber associated with telephone 10 uses a particular prepaid platform as a provider for long distance service. In various embodiments, a class of service parameter may consist of the telephone number of the prepaid platform 45.

In step 215, the SCP 35 returns to the Hub 20 an AuthTerm (Authorized to Terminate) TCAP response message, containing a prepaid platform number and a subscriber personal identification number (PIN). The Hub 20 in step 220 then formulates an ISDN User Part (ISUP) Initial Address Message (IAM) and forwards the IAM via the STP 25 through SS7 network 30 and STP 29 to a prepaid platform 45. The IAM formulated by the Hub 20 contains the subscriber telephone number (or calling number), the platform number (which was obtained directly or indirectly from the class of service parameter from the subscriber profile), and a called number (or originally called number). This information may be placed in fields within a SS7 LAM, for example.

The prepaid platform 45 responds to the Hub 20 with an ISUP Address Complete Message (ACM) in step 225. At this point, the circuit between the subscriber's phone 10 and the prepaid platform has been established, and the caller hears a ring. When the prepaid platform 45 "answers", or goes off hook, an ISUP Answer Message (ANM) is forwarded from the prepaid platform 45 to the Hub 20 in step 230.

In the exemplary embodiment, the prepaid platform 45 answers by going off hook and executing Interactive Voice Response (IVR) software, which prompts the subscriber to enter data necessary to validate the subscriber in step 235. Such data may include a personal identification number (or PIN).

In step 240, the subscriber enters the data requested by the IVR software, hosted on the prepaid platform 45. In an embodiment, the subscriber enters such data via a Touch Tone phone 10, which implements Dual Tone MultiFrequency (DTMF) signaling. The DTMF entries are captured by the IVR software and used to validate the subscriber in step 245. Such a validation process is implemented by the prepaid platform 45, and may include matching the subscriber's telephone number (i.e., the calling number contained within the LAM message send at step 220) and PIN (obtained by the IVR software at step 240) to a user database. Validation may also include verifying that the subscriber has a minimum threshold of time and/or money left on the subscriber's account with the prepaid platform service.

Once the subscriber has been validated, then in step 250 the prepaid platform 45 connects the subscriber's call to telephone 65 of the called party. This takes place via a long distance network of an Inter eXchange Carrier (IXC) 50, which interfaces to an Access Tandem (AT) switch 55 of the called party's local carrier. The AT switch 55 is ultimately connected to an EO 60 for the called party. The EO 60 establishes an interface to the telephone network for the called party's telephone 65.

If the subscriber is not validated in step 245, then the call is disconnected in step 255. Additionally, after either (or both) of the parties hangs up, the subscriber's call is disconnected at step 255.

Figure 3:
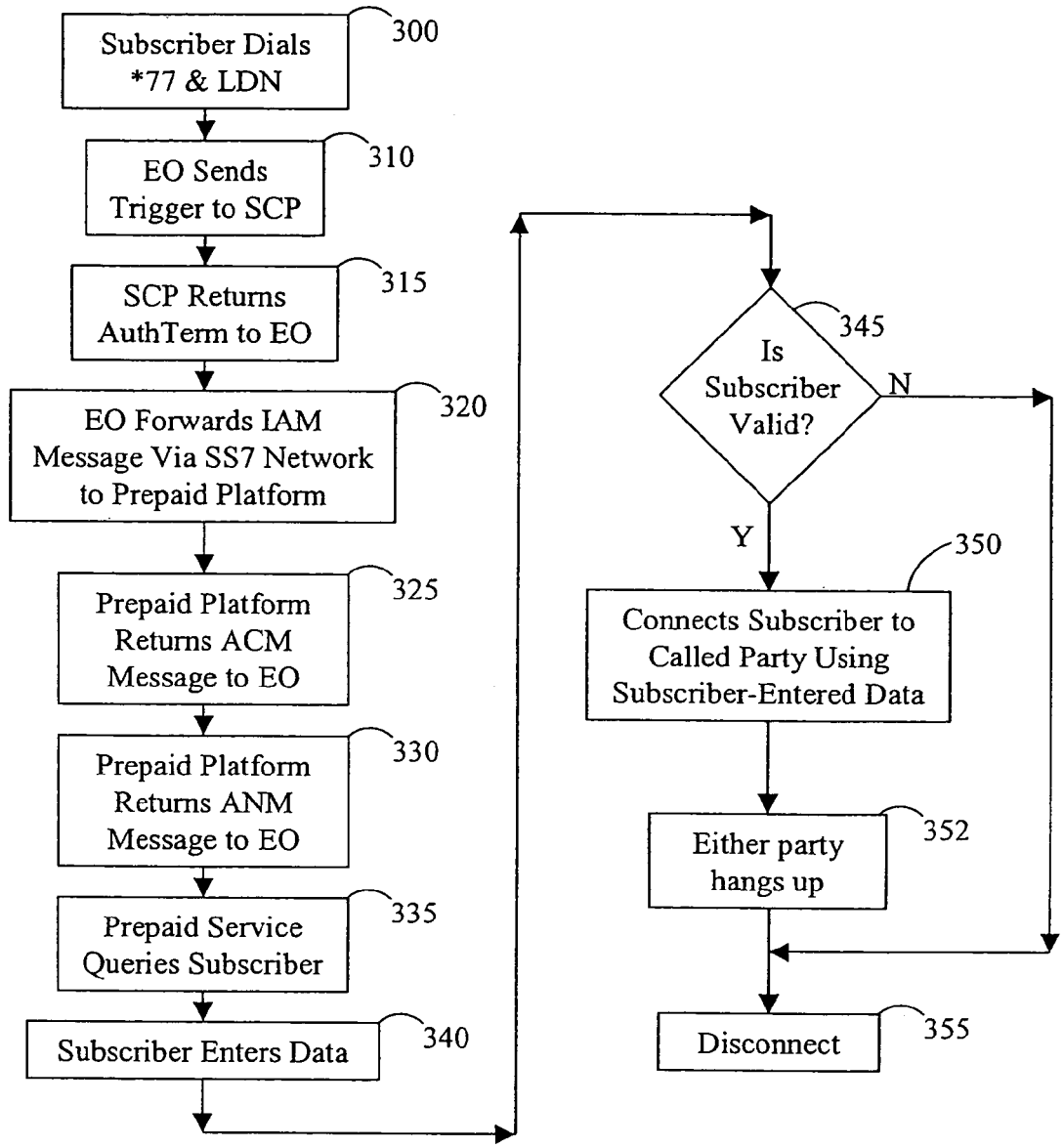
FIG. 3 illustrates a flow chart for an exemplary process for automatically routing a long distance call to a prepaid service platform using a feature code trigger.

FIG. 3 comprises an exemplary flow diagram for an embodiment of the present invention in which a subscriber dials a feature code to initiate a 1+routing process. In such an embodiment, a subscriber, using a telephone (or subscriber terminal) 10 dials (or inputs) a dial string consisting of a feature code plus a long distance number (LND) in step 300. A feature code is generally of the form "*NN", where NN represents two digits, and is used to invoke a particular telephone service option. Call return (*69) is such a service, which may be invoked by a subscriber dialing the feature code *69 to find out and call back the last number that called the subscriber. Note that a feature code, however could have more than two digits following the star, or may be a string of digits terminated by a pound sign ("#"). Therefore, where an example dial string is "9912022820987", the exemplary feature code is "99" and the exemplary LDN is "12022820987", including the area code.

In step 310, the end office (EO) 15 to which the subscriber's telephone 10 is connected begins the exemplary feature code 77 processing by sending a feature code (FC) trigger (i.e., a TCAP query message) to an SCP 35 via an STP 25. In step 315, the SCP 35 sends an AuthTerm (Authorization to Terminate) TCAP response to the EO 15 via the STP 25.

The EO 15 then commences the call routing process in step 320 by forwarding an IAM message via STP 25 through the SS7 network, which is implemented by STPs, such as STP 25, 28 and 29, to a prepaid platform 45. The prepaid platform 45, then returns an ACM message to the EO 15 via the SS7 network 30, in step 325. At this point, a circuit between the subscriber's telephone 10 and the prepaid platform 45 has been established, and the subscriber hears ringing on the line.

In step 330, an ANM is returned by the prepaid platform 45 to the EO 15 via the SS7 network 30, when the prepaid platform 45 "answers". In the exemplary embodiment, the prepaid platform 45 answers by going off hook and executing an Interactive Voice Response (IVR) system, which prompts the subscriber to enter data necessary to validate the subscriber in step 335. Such data may include a personal identification number (or PIN).

In step 340, the subscriber enters the data requested by the IVR system, hosted on the prepaid platform 45. In an embodiment, the subscriber enters such data via a TouchTone phone 10, which implemented Dual Tone MultiFrequency (DTMF) signaling. The DTMF signal entries are captured by the IVR system and used to validate the subscriber in step 345. Such a validation process is implemented by the prepaid platform, and may include matching the subscriber's telephone number (i.e., the calling number contained within the IAM message send at step 320) and PIN (obtained by the IVR system) to a user database. Validation may also include verifying that the subscriber has a minimum threshold of time and/or money left on the subscriber's account with the prepaid platform service.

If the subscriber has been validated, then in step 350 the prepaid platform connects the subscriber's call to telephone 65 of the called party. This takes place via a long distance network of an Inter eXchange Carrier (IXC) 50, which interfaces to an Access Tandem (AT) switch 55 of the called party's local carrier. The AT switch 55 is ultimately connected to an EO 60 for the called party. The EO 60 establishes an interface to the telephone network for the called party's telephone 65.

If the subscriber is not validated in step 345, then the call is disconnected in step 355. Additionally, after one of the parties hangs up, the subscriber's call is disconnected in step 355.

Figure 4:
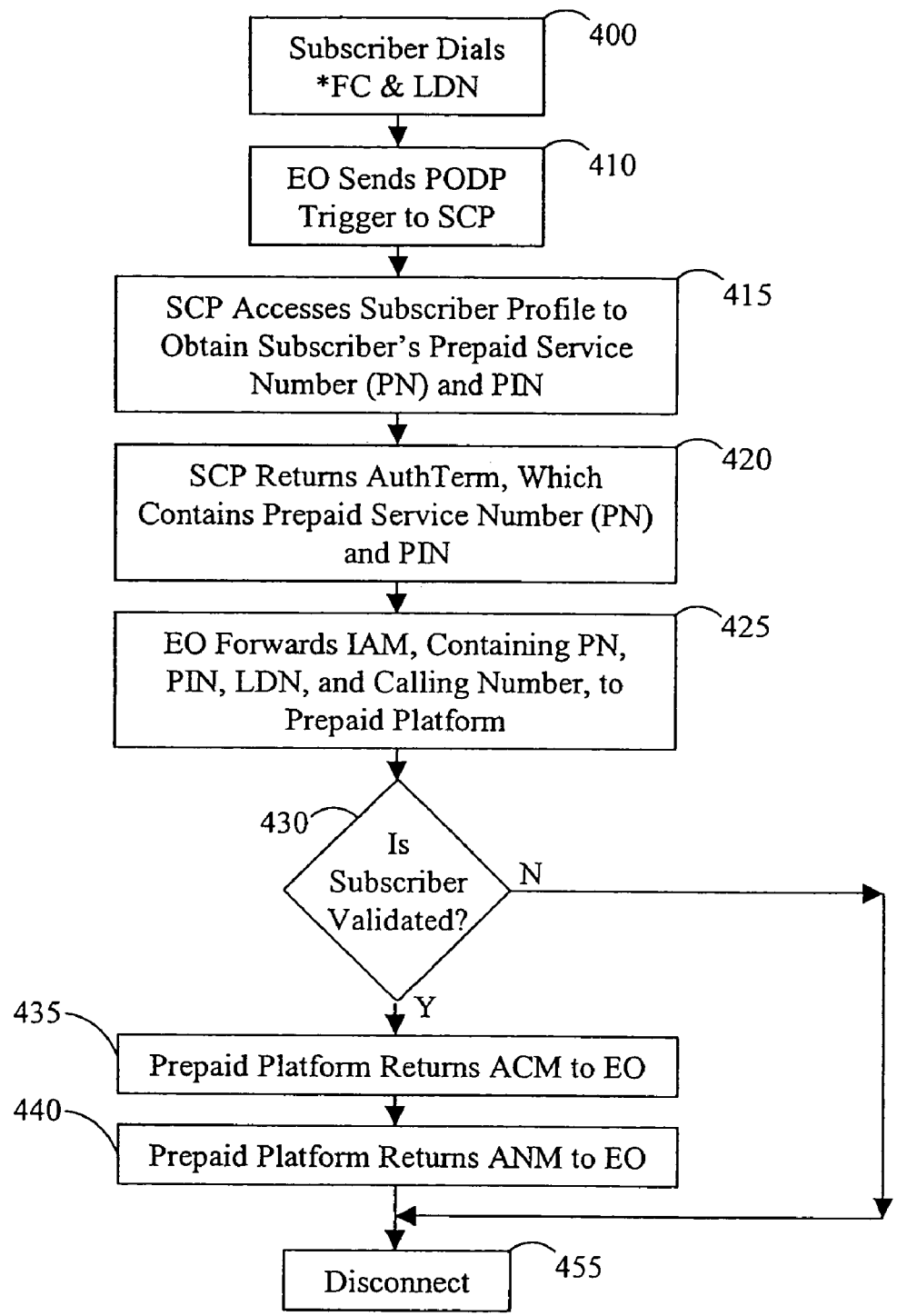
FIG. 4 illustrates a flow chart for an exemplary process for automatically routing a long distance call to a prepaid service platform using class of service routing plus a feature code trigger.

FIG. 4 comprises an exemplary flow diagram for another embodiment of the present invention in which a subscriber dials a feature code to initiate a 1+routing process. In such an embodiment, a subscriber, using a telephone 10 dials a feature code, then a long distance number (LDN) in step 400. An example dial string is "*9912022820987", wherein the exemplary feature code is "*99" and the exemplary LDN is "12022820987", including the area code.

In step 410, the end office (EO) 15, through which the subscriber's telephone 10 interfaces to the telephone network, sends a Public Office Dialing Plan (PODP) trigger to an SCP 35. This trigger mechanism is implemented via an exchange of TCAP messages. In response to the PODP trigger, the SCP 35 first accesses a subscriber profile record in step 415. Such a profile record is stored within an SCP database, in an exemplary embodiment.

The SCP 35, in step 420, subsequently returns an Auth-Term (Authorization to Terminate) TCAP response message to the EO 15. The AuthTerm service package will contain, among other data, a class of service parameter indicating a telephone number for connecting to a prepaid platform, and a personal identification number (PIN) for the subscriber.

Data from the AuthTerm is used by the EO 15 to formulate an IAM, which is also forwarded in step 425 to the prepaid platform 45 via the SS7 network 30. The IAM is comprised of subscriber data, which is further comprised of a subscriber telephone number, a subscriber PIN, and routing instructions (such as a prepaid platform telephone number), and the long distance number dialed by the subscriber in step 400.

In step 430 the prepaid platform validates the subscriber, using the subscriber data and called telephone number contained in the IAM received from the EO 15 in step 425. If the subscriber cannot be validated, then the call is disconnected in step 455. Validation may include verifying that the subscriber has access privileges to the prepaid system, and verifying that the subscriber's account contains a threshold amount of time to allow for connecting a call.

Once the subscriber has been validated, the prepaid platform 45, then returns an ACM message to the EO 15 via the SS7 network 30, in step 435. At this point, a circuit between the subscriber's telephone 10 and the called party's telephone 65 has been established, and the subscriber hears ringing on the line.

In step 440, an ANM is returned by the prepaid platform 45 to the EO 15 via the SS7 network 30, when the called party's telephone 65 goes off hook. When the parties end the call by placing the receiver on hook, the circuit is disconnected in step 455.

Figure 5:
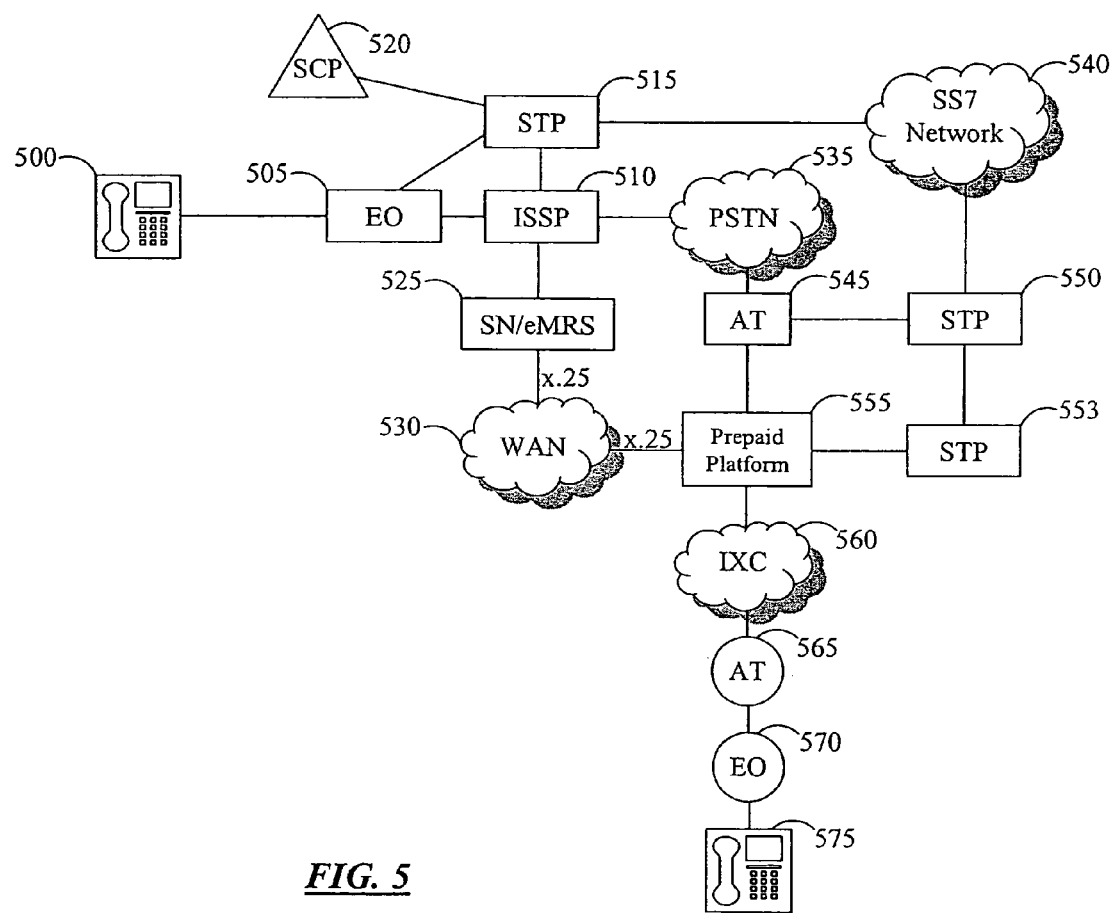
FIG. 5 comprises a functional block diagram illustrating another exemplary environment in which embodiments of the present invention operate.

FIG. 5 comprises a functional block diagram illustrating another exemplary environment in which embodiments of the present invention operate. A subscriber, using a subscriber telephone 500, calls a party on called party telephone 575. Using embodiments of the present invention, the subscriber's long distance call will be routed automatically via a telephone network, depicted as PSTN 535 (but could be any underlying communications technology) to a prepaid platform 555.

A call placed from a subscriber telephone (or a subscriber terminal) 500 enters the telephone network via an End Office (EO) switch 505. The EO 505 is essentially an SSP 510 that is located at the edge of the telephone network and is generally responsible for providing a network interface for low bandwidth circuits (e.g., of DS-0 rates). The EO 505 connects to an SSP 510 to distribute a telephone call over a PSTN 535. The PSTN 535 is a signal communications network comprised of a plurality interconnected communications switches (e.g., SSP 510 switches) for routing communications messages (e.g., telephone calls). An exemplary SSP 510 is an AT&T 5ESS switch. The SSPs (including SSP 510) implementing the PSTN 535 of FIG. 5 may transport communications via a digital transmission (DS) hierarchy or via Integrated Services Digital network (ISDN).

Control signaling may be accomplished using a SS7 network 540. The SS7 network 540 is a signal control network comprised of a plurality of packet switches such as STP (Signal Transfer Point) 515, 550 and 553, for routing a control message, wherein the control message directs the path of the communications message (e.g., telephone call) through the signal communications network (e.g., PSTN 535). An additional control signaling path may be provided via an X.25 connection to a data network, such as a Wide Area Network (WAN) 530. An intermediate computer system known as a Service Node (SN) 525 and a prepaid platform 555 are connected via the WAN 530, in an exemplary embodiment. A Service Node 525 is also known as a Compact Service Node. In an alternate embodiment, another intermediate computer system, known as an enhanced media Resource Server (eMRS) may be substituted for a Service Node 525. Both the SN and the eMRS are Telcordia Technologies computer systems used for application development, but also having switching capabilities and interfaces to the PSTN 535 (via an SSP 510) and a data communications network, such as the WAN 530.

A telephone call from a subscriber's telephone 500 to a called party's telephone 575 will follow a path from an EO 505 through an SSP 510 and over the PSTN 535 to an Access Tandem (AT) switch 545. An Access Tandem switch 545 is an SSP located at the edge of the telephone network which provides an interface point for a carrier or service provider into the Incumbent Local Exchange Carrier's (ILEC's) network.

In the current embodiment, the prepaid platform 555 interfaces to an AT 545. The prepaid platform 555 accepts a call and connects the call via an Inter eXchange Carrier (IXC) network 560. The call is then transferred from the IXC network 560 at an AT 565, which provides an interface for the long distance carrier into a local exchange network. The subscriber's call is ultimately connected to the called party's telephone 575 through an EO switch 570.

Figure 6:
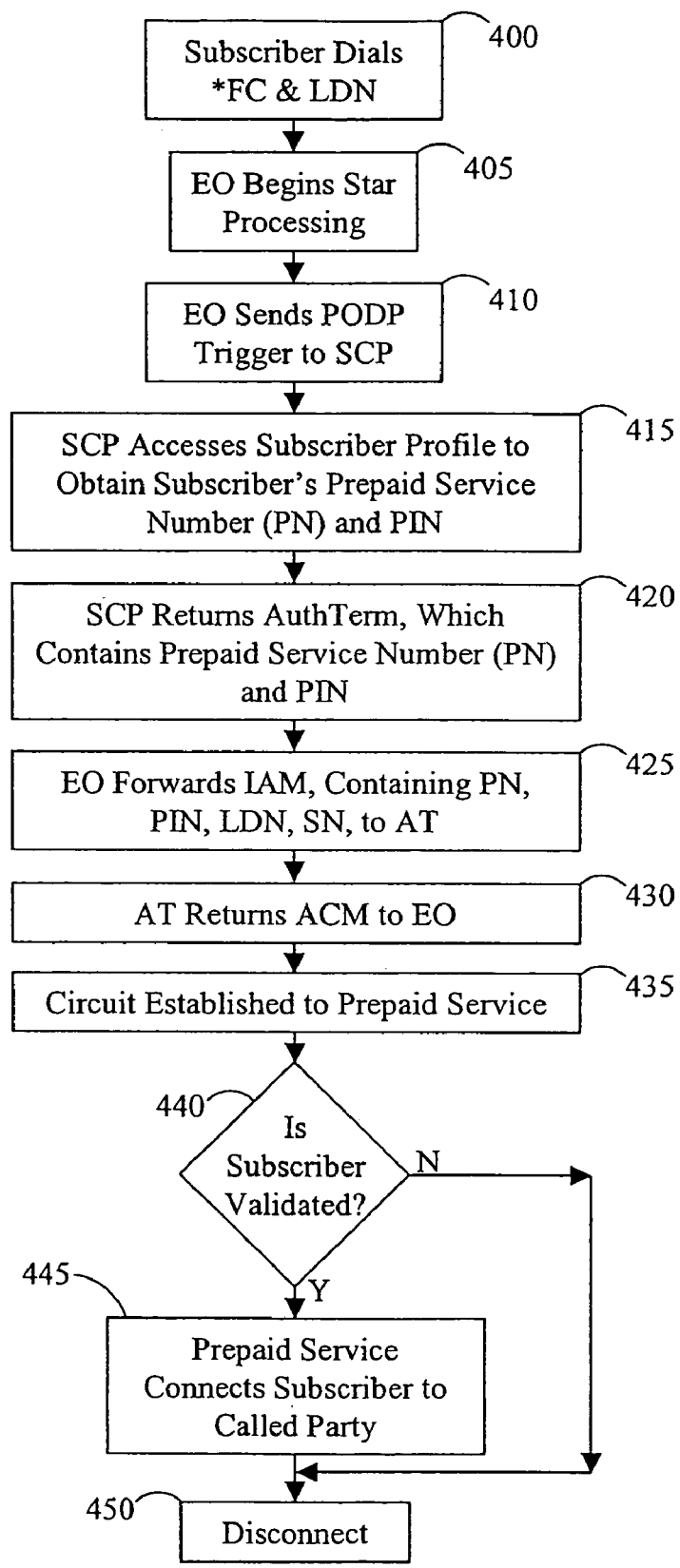
FIG. 6 illustrates a flow chart for an exemplary process for automatically routing a long distance call to a prepaid service platform using class of service routing to a service node.

FIG. 6 comprises an exemplary flow diagram for an embodiment of the present invention. In step 600, the subscriber, using the subscriber's telephone (or terminal) 500, dials a string of digits representing a long distance telephone number.

EO 505 captures the digits and sends a TCAP query to SCP 520 via STP 515 in step 605. Upon receiving the TCP query, the SCP 520 accesses a subscriber profile record stored in a SCP database and returns a class of service routing parameter in a TCAP response message at step 610. The class of service routing parameter, in this case, indicates that a long distance call from the subscriber should be routed to a prepaid platform 555.

From the received TCAP response, the EO 505 then formulates an IAM, comprising the calling number (i.e., the subscriber's telephone number) and the called telephone number. The EO 505 then forwards the IAM to an ISDN Office, housing an SSP 510, which contains IDSN interface cards.

In step 620 the SSP 510 connects the subscriber to the Service Node (SN) 525 via a first ISDN circuit. The SN 525 accesses a locally stored subscriber record in step 625. The locally stored subscriber record contains a prepaid platform number associated with the subscriber telephone number (or other subscriber identifier, in alternative embodiments). In step 630, the SN 635 returns the prepaid platform number to the SSP 510 within a service package (i.e., a TCAP message).

In step 635, the SSP 510 formulates an IAM, containing the subscriber telephone number and the prepaid platform telephone number, then forwards the IAM via an STP 515 through a SS7 network 540 and STPs 550 and 553 to a prepaid platform 555. The prepaid platform 555 then returns an ACM to the SSP 510 in step 640. The SSP 510 subsequently connects the prepaid platform 555 to the SN 525 via a second ISDN circuit in step 645.

With a communications channel in place between the SN 525 and the prepaid platform 555, the SN 525 now out pulses (using DTMF, in an embodiment) the digits for the subscriber (or calling) number, the PIN, and the called (i.e., the long distance) number over the second ISDN circuit in step 650.

In step 655, the prepaid platform validates the subscriber. If the subscriber is not validated in step 655, then the call is disconnected in step 675.

However, if the subscriber is validated in step 655, then the prepaid platform connects the called party to the second ISDN circuit in step 660. In step 665, the SN 525 internally bridges the first and second circuits (connecting the first circuit output to the second circuit input). Next, in step 670, the EO 505 connects the first circuit input port (to which the subscriber is attached) to the second circuit output port (to which the prepaid platform is attached) to join the two circuits into one circuit, and thereby permitting the EO 505 to reclaim two ports. When a party goes on hook, the subscriber's call will be disconnected in step 675.

Figure 7:
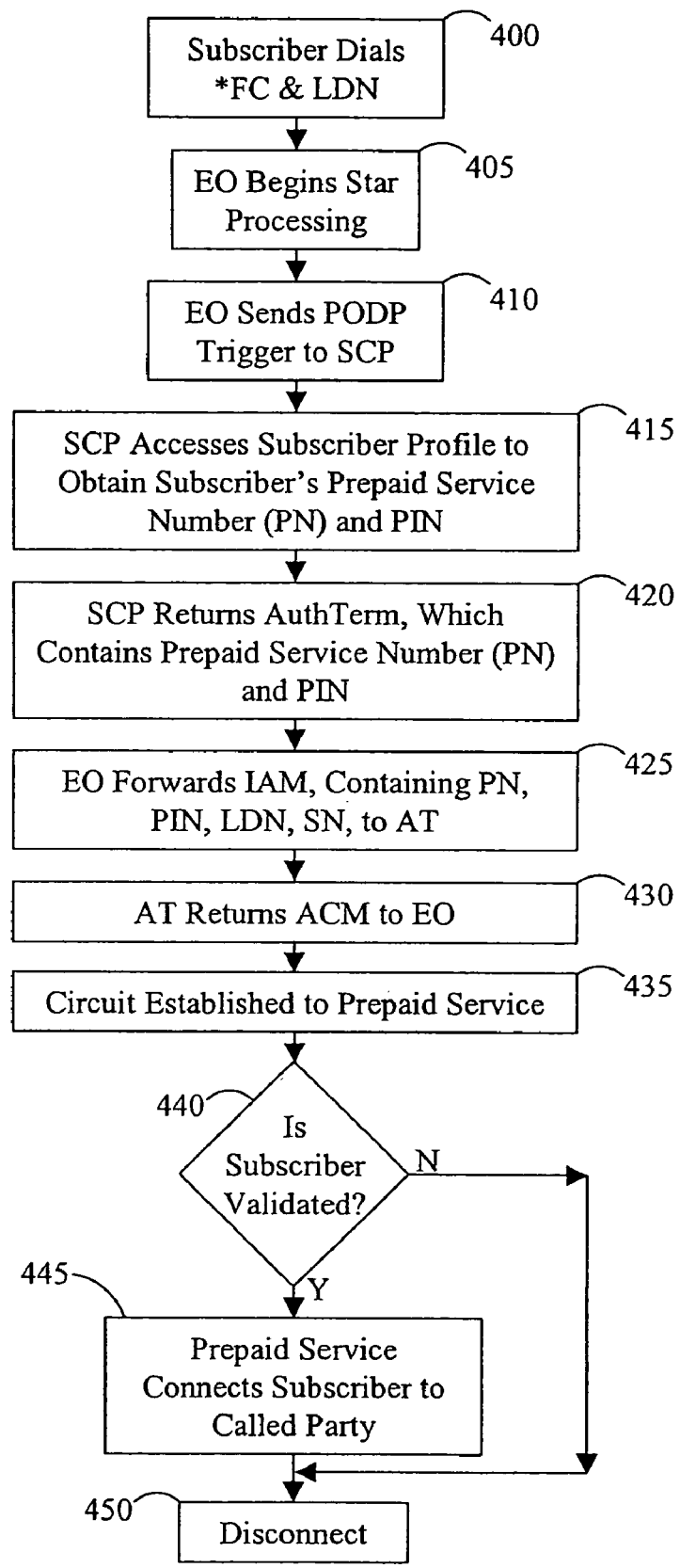
FIG. 7 illustrates a flow chart for an exemplary process for automatically routing a long distance call to a prepaid service platform using class of service routing to a service node PRI (Primary Rate Interface) using a SCP.

FIG. 7 comprises a flow chart of another exemplary embodiment of the present invention employing a class of service routing to a SCN (Compact Services Node) PRI using a SCP. Beginning with step 700, a subscriber using telephone (or subscriber terminal) 500 dials a dial string consisting only of a long distance number (e.g., 12022820987). At step 705 an EO 505 captures the dialed digits and forwards a TCAP message to a SCP 520. The SCP 520 accesses a SCP database to retrieve a subscriber profile record. From this profile record, the SCP 520 extracts a class of service routing parameter and returns that parameter in a TCAP response message to the EO 505 in step 710.

The EO 505 populates an IAM with the class of service routing parameter. This IAM is subsequently forwarded in step 715 to an SSP 510 via an STP 515, which resides at the edge of SS7 Network 540.

A SSP DN (Dialed Number) trigger SPA (Service Package Application) executes to extract the subscriber number and the called number from the IAM message. The DN trigger SPA then formulates and forwards a TAT trigger to the SCP 520 in step 720. The SCP 520 returns a TCAP response to the ISSP 510 in step 725. The TCAP response comprises a calling (or subscriber) number, a subscriber PIN, a called number, and a prepaid platform number.

In step 728, the SCP 520 also forwards a message to a SN 525, the message comprising a subscriber identifier (e.g., the subscriber's telephone number), a subscriber PIN, and a prepaid platform number. At this point, the SSP 510 establishes a first circuit between the subscriber's telephone 500 and the SN 525.

In step 733, the SN 525 forwards the subscriber profile data to the SSP 510. The SSP 510 then forwards an IAM to the prepaid platform 555, the said IAM comprising a calling (or subscriber) number and the prepaid platform number in step 735.

The prepaid platform 555 responds in step 740 by returning an ACM to the SSP 510 via the SS7 Network 540. At this point, in step 743 the SSP 510 establishes a second communications circuit between the SN 525 and the prepaid platform 555.

In step 745, the SSP 510 forwards an ACM to the SN 525. The prepaid platform 555 then forwards an ANM to the SSP 510 via the SS7 Network 540 in step 749. And, the SSP 510 subsequently forwards that ANM to the SN 525 in step 750.

Upon receiving the ANM of step 750, the SN 525 recognizes that the prepaid platform has gone off hook. The SN 525, in step 753, out pulses (via DTMF signaling in an embodiment) the subscriber (or calling) number, the subscriber PIN, and the called number to an IVR system, hosted on the prepaid platform 555. This DTMF out pulsing of a subscriber verification data and the dialed number takes place over the second communications circuit, which connects the SN 525 and the prepaid platform 555.

In step 755 the prepaid platform validates the subscriber, using the subscriber data (e.g., the calling number and PIN) and the called number which were out pulsed by the SN 525 over the second communications circuit at step 753. If the subscriber is not valid, the call is disconnected at step 780.

A valid subscriber is one who is authorized to use the prepaid platform service. Additional levels of validation may include such factors as whether the subscriber has a threshold amount of time and/or money in the subscriber's prepaid platform account.

A subscriber who is validated in step 755 is connected to the called party in step 765. This connection is initiated by the SN 525 which internally bridges circuits one and two. The bridging of circuits results in the output port of circuit one feeding into the input port of circuit two.

In step 770, the SN 525 next forwards a message to the SPP 510 requesting a consolidation of resources. In response to the resource consolidation message, the ISSP joins circuits one and two. The joining of these circuits results in the input port of circuit one being cross-connected to the output port of circuit two. As a result, the output port of circuit two and the input port of circuit one are no longer needed to establish communications between the subscriber and the called party, and thus these ports may be reclaimed by the SSP 510.

Either or both parties (subscriber and called party) go off hook to end the call. The subscriber's call is then disconnected in step 780.

Figure 8:
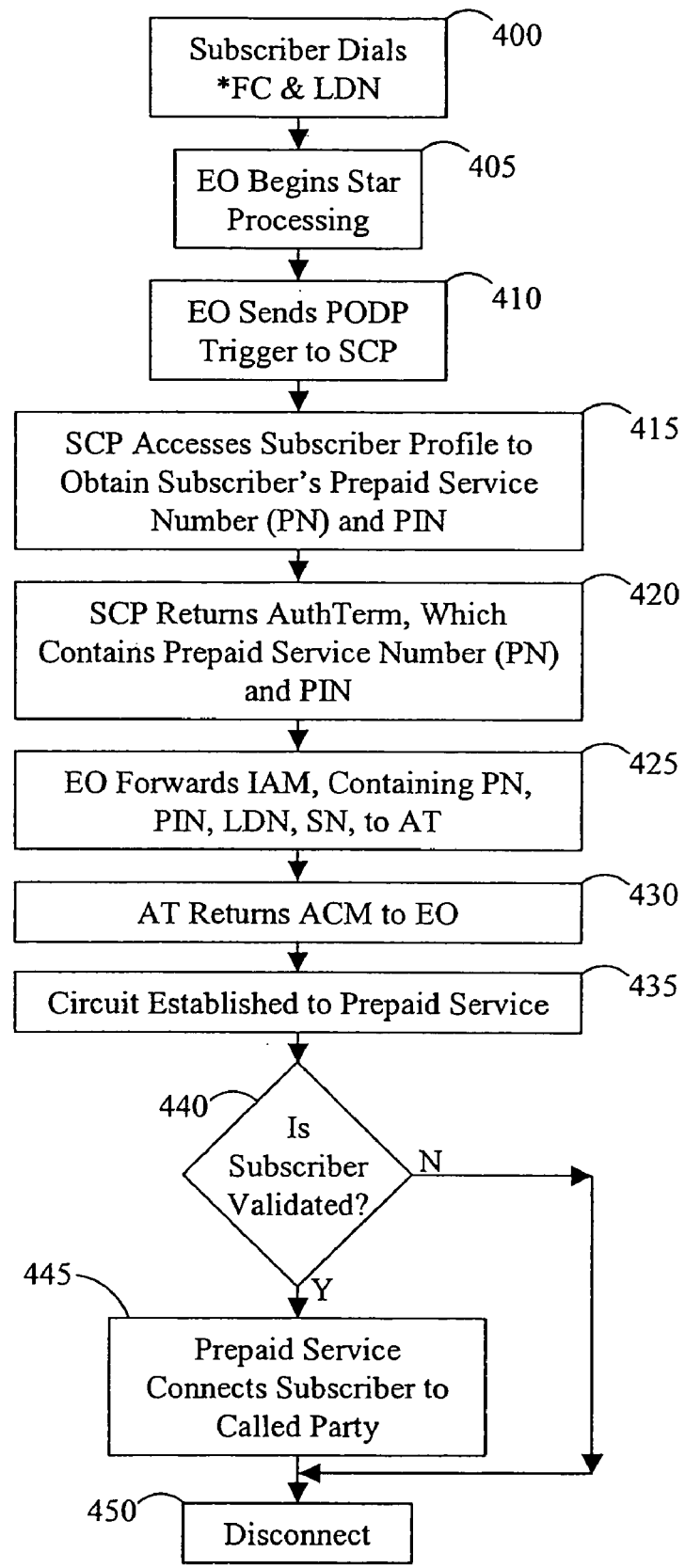
FIG. 8 illustrates a flow chart for an exemplary process for automatically routing a long distance call to a prepaid service platform using class of service routing to a PRI using a SCP.

FIG. 8 comprises a flow chart of an exemplary embodiment of the present invention involving a class of service routing to a PRI using a SCP. Beginning with step 800, a subscriber using telephone (or subscriber terminal) 500 dials a string of digits consisting of a long distance number (e.g., 12022820987). At step 805 an EO 505 captures the dialed digits and forwards a TCAP message to a SCP 520. The SCP 520 accesses a SCP database to retrieve a subscriber profile record. From this profile record, the SCP 520 extracts a class of service routing parameter and returns that parameter in a TCAP response message to the EO 505 in step 810.

The EO 505 populates an LAM with the class of service routing parameter. This LAM is subsequently forwarded in step 815 to an SSP 510 via an STP 515, which resides at the edge of SS7 Network 540.

A SSP DN (Dialed Number) trigger SPA (Service Package Application) executes to extract the subscriber number and the called number from the LAM message. The DN trigger SPA then formulates and forwards a TAT trigger to the SCP 520 in step 820. The SCP 520 subsequently, in step 825, accesses a subscriber profile record stored in an SCP database, and extracts a prepaid calling number to which the subscriber's long distance calls are to be routed. Next, the SCP 520 returns a TCAP response to the SSP 510 in step 830. The TCAP response (in the form of an AuthTerm) comprises a calling (or subscriber) number, a subscriber PIN, a called number, and a prepaid platform number.

In step 835, the SSP 510 extracts the subscriber data, including the routing instructions from the AuthTerm, and populates an IAM, which is then forwarded to the prepaid platform 555. In this instance, the information inserted into an IAM comprises the subscriber (or calling) number and the prepaid platform number (i.e., the routing instructions).

In step 840, the prepaid platform 555 returns an ACM to the SSP 510 via the SS7 network 540. At this point a communications circuit is established, and the subscriber hears ringing. When the prepaid platform 555 goes off hook, the prepaid platform 555 returns an ANM to SSP 510 via the SS7 network 540.

The prepaid platform 555, in an embodiment, next invokes an IVR system, which queries the subscriber for the subscriber's PIN in step 850. In response, the subscriber enters a PIN in step 855. Entry of the PIN may be via DTMF signaling, depending upon the requirements of the IVR system (which may instead require voice input, for example).

In step 860, the prepaid platform validates the subscriber. If the subscriber is not valid, the call is disconnected in step 870.

If the subscriber is valid, as determined by the prepaid platform 555 in step 860, then the prepaid platform 555 in step 865 connects the subscriber's call to the telephone 575 of the called party via an IXC network 560 and AT 565 and EO 570. When either party goes on hook, the call is disconnected in step 870.

The preceding examples illustrate various embodiments of the present invention in which long distance telephone calls placed by a subscriber to a prepaid service are automatically routed to that prepaid service upon the subscriber dialing a long distance number or a feature code followed by a long distance number. In such cases, the long distance number dialed by the subscriber is that of a party the subscriber desires to contact. Unlike conventional methods and systems, the subscriber need not first dial a telephone number for the prepaid service provider, before dialing the number of the called party.

Other embodiments of the present invention may be readily derived by one skilled in the art from the discussed exemplary embodiments. For instance, a subscriber may be an automated process, rather than a person. Such embodiment, for example, would permit the automated downloading of software upgrades or the automated faxing of documents to remote locations.

Additionally, the discussed embodiments described examples in the context of a public telephone system, but the concepts are equally applicable to a private telephone system for a business having widely dispersed locations. And, the concepts described by way of public telephone examples also relied on permanent circuits as communications channels. However, these concepts are also applicable to switched circuit technologies, as well.

Various embodiments of the present invention have been described in fulfillment of the various objects of the invention. It should be recognized that these embodiments are merely illustrative of the principles of the present invention. Numerous modifications and adaptations thereof will be apparent to those skilled in the art without departing from the spirit and scope of the present invention.

What is claimed is:

1. A method for automatically routing a call from a subscriber terminal to a prepaid platform comprising:
   receiving a dial string from the subscriber terminal, wherein the dial string includes a number;
   receiving a profile record comprising subscriber data from a database server, wherein the subscriber data comprises a calling number and routing instructions;
   routing the call from the subscriber terminal to the prepaid platform in accordance with the routing instructions; and
   forwarding the calling number and the number to the prepaid platform,
   wherein the routing of the call from the subscriber terminal to the prepaid platform being responsive to a class of service routing parameter associated with the subscriber terminal.

2. The method of claim 1, wherein the routing instructions comprise the class of service routing parameter.

3. The method of claim 1, wherein the dial string includes a feature code followed by the number, the routing of the call from the subscriber terminal to the prepaid platform being responsive to the feature code.

4. The method of claim 1, wherein the database server comprises a Signal Control Point (SCP).

5. A method for automatically routing a call from a subscriber terminal to a prepaid platform comprising:
   receiving a dial string from the subscriber terminal, wherein the dial string includes a number;
   receiving a profile record comprising subscriber data from a database server, wherein the subscriber data comprises a calling number, routing instructions and a personal identification number (PIN);
   validating the subscriber by requesting the PIN from the subscriber;
   routing the call from the subscriber terminal to the prepaid platform in accordance with routing instructions; and
   forwarding the calling number and the number to the prepaid platform.

6. The method of claim 5, wherein the forwarding step further comprises forwarding the PIN to the prepaid platform.

7. The method of claim 6, wherein the calling number, the PIN, and the number are forwarded to the prepaid platform encapsulated within a Signaling System 7 (SS7) message.

8. The method of claim 7, wherein the SS7 message comprises an Initial Address Message (IAM).

9. A system for automatically routing a call from a subscriber terminal to a prepaid platform comprising:
   a subscriber terminal for receiving a dial string from a subscriber, wherein the dial string includes a number;
   a database server for storing subscriber data, wherein the subscriber data comprises a calling number and routing instructions;
   a signal communications network comprised of a plurality of interconnected communications switches for routing a communications message;
   a signal control network comprised of a plurality of interconnected packet switches for routing a control message, wherein a control message directs the path of the communications message through the signal communications network; and
   a prepaid platform for providing the subscriber with access to communications services;
   wherein the subscriber terminal is connected to the signal communications network;
   wherein the signal control network is connected to the signal communications network and the prepaid platform;
   wherein the prepaid platform is connected to the signal communications network and the signal control network; and
   wherein in response to the subscriber inputting the dial string, the communications message generated from the subscriber terminal is routed from the subscriber terminal via the signal communications network to the prepaid platform in accordance with the routing instructions, and the calling number are forwarded to the prepaid platform via the signal control network, the routing of the call from the subscriber terminal to the prepaid platform being responsive to a class of service routing parameter associated with the subscriber terminal.

10. A system for automatically routing a call from a subscriber terminal to a prepaid platform comprising:
    a subscriber terminal for receiving a dial string from a subscriber, wherein the dial string includes a number;
    a database server for storing subscriber data, wherein the subscriber data comprises a calling number, routing instructions and a personal identification number (PIN);
    a database server for storing subscriber data, wherein the subscriber data comprises a calling number and routing instructions;
    a signal communications network comprised of a plurality of interconnected communications switches for routing a communications message;
    a signal control network comprised of a plurality of interconnected packet switches for routing a control message, wherein a control message directs the path of the communications message through the signal communications network; and
    a prepaid platform for providing the subscriber with access to communications services;
    wherein the subscriber terminal is connected to the signal communications network;
    wherein the signal control network is connected to the signal communications network and the prepaid platform;
    wherein the prepaid platform is connected to the signal communications network and the signal control network; and
    wherein in response to the subscriber inputting the dial string and the PIN, the communications message generated from the subscriber terminal is routed from the subscriber terminal via the signal communications network to the prepaid platform in accordance with the routing instructions, and the calling number and the number are forwarded to the prepaid platform via the signal control network.

11. The system of claim 9, wherein the signal communications network is comprised of a plurality of interconnected ISDN switches for routing a communications message.

12. The system of claim 9, wherein the routing instructions comprises a class of service parameter.

13. The system of claim 9, wherein the dial string includes a feature code followed by the number.

14. The system of claim 9, wherein the database server comprises a Signal Control Point (SCP).

15. The system of claim 10, wherein the PIN is forwarded to the prepaid platform via the signal control network.

16. The system of claim 15, wherein the calling number, the PIN, and the number are forwarded to the prepaid platform encapsulated within a Signaling System 7 (SS7) message.

17. The system of claim 16, wherein the SS7 message comprises an Initial Address Message (IAM).

18. The method of claim 5, wherein the dial string includes a feature code followed by the number.

19. The system of claim 10, wherein the dial string includes a feature code followed by the number.

* * * * *